Feb. 19, 1929.
R. S. SANFORD
1,702,394
BRAKE APPLYING MEANS
Filed May 6, 1927
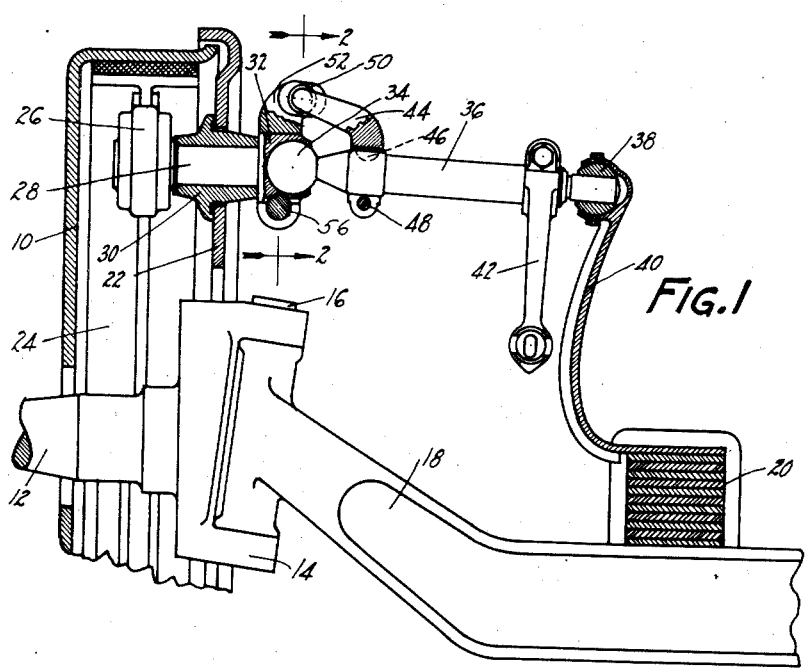
INVENTOR
ROY S. SANFORD
BY
M. W. McConkey
ATTORNEY Patented Feb. 19, 1929.

1,702,394

UNITED STATES PATENT OFFICE.

ROY S. SANFORD, OF SOUTH BEND, INDIANA, ASSIGNOR TO BENDIX BRAKE COMPANY, OF CHICAGO, ILLINOIS, A CORPORATION OF ILLINOIS.

BRAKE-APPLYING MEANS.

Application filed May 6, 1927. Serial No. 189,232.

This invention relates to brakes and is illustrated as embodied in novel operating means for a brake on a front automobile wheel. An object of the invention is to provide a simple means of adjustment for the brake and at the same time to simplify the means which permits the transmission of brake-applying force while at the same time permitting the swivelling of the wheel in steering. In one desirable arrangement the brake is applied through two shafts arranged end to end and which are connected by a ball-and-socket joint substantially in the swivelling axis of the wheel, the shafts being provided with interengaging crank arms at their adjacent ends. Preferably at least one of the crank arms is adjustable angularly of its shaft to preserve the positions of the various parts of the operating mechanism with respect to the swivelling axis of the wheel as the brake wears in service.

The above and other objects and features of the invention, including various novel and desirable features of construction, will be apparent from the following description of two illustrative embodiments shown in the accompanying drawing, in which:

Figure 1 is a vertical section through the upper part of one front brake and through the novel operating mechanism therefor;

Figure 2 is a section through the operating mechanism on line 2—2 of Figure 1 and showing the adjustment;

Figure 3 is a view corresponding to part of Figure 1 but showing a different arrangement of the above-identified crank arms; and Figure 4 is a section through the operating mechanism of Figure 3, showing the adjustment.

The brake in Figure 1 includes a drum 10 rotating with a wheel (not shown) mounted on the spindle 12 of a front wheel knuckle 14 swivelled by a king-pin 16 or the like at one end of a front axle 18 on which is secured by the usual clips the spring 20. The open side of the drum 10 is closed by a suitable backing plate 22. The brake proper includes brake shoes 24 of any desired form which are forced against the drum to apply the brake by suitable means such as a cam 26 having a cam-shaft 28 journalled in a support or bracket 30 secured to the backing plate 22. The shaft 28 is shown as terminating in an enlargement 32 forming a socket having its edge flange peened or spun over a ball 34 integrally formed on the end of a second shaft 36, arranged end to end with respect to the shaft 28, and having its inner end slidably and universally supported by a ball 38 mounted in a socket at the upper end of a supporting bracket 40 formed as an upward extension of a spring pad holding the spring 20. The shaft 36 is provided with an operating arm 42.

In the arrangement of Figure 1 the shaft 36 is formed with a crank arm 44 secured thereto, as by a Woodruff key 46, and secured in place by a clamp screw 48. The crank arm 44 is formed at its end with an integral ball 50 engaging a plane thrust surface formed on the end of a crank arm 52 having a split hub encircling the enlarged portion 32 of shaft 28 as shown in Figure 2. The portion 32 is formed with pinion teeth 54 meshing with rack teeth formed on an adjusting member 56 bridging the slotted hub of the crank arm and threaded at its ends to receive clamp nuts 58. In adjusting the crank arm 52, one of the nuts 58 is loosened and the other is then tightened, thus drawing the rack 56 lengthwise and turning the crank arm 52 upon the enlarged portion 32 of the shaft 28. In the arrangement of Figures 1 and 2 the interconnecting parts of the crank arms 44 and 52 are above the shafts 28 and 36 and when the brake is applied the center of the ball 50 is in or immediately adjacent the swivelling axis of the wheel.

In the arrangement of Figures 3 and 4, the corresponding crank arms extend downwardly. Crank arm 60, carried by the shaft 36, terminates in a ball 62 engaging the end of the crank arm 64 encircling the enlarged portion 32, which in this case is formed with worm teeth 66 meshing with a worm 68 shown as a bolt bridging the slotted upper part of the crank arm 64. Bolt 68 has a head 70 at one end formed with a conical base seated in a corresponding seat in the crank arm 64, and has at its upper end a nut 72 formed with a corresponding conical base also seated in a conical recess. By loosening the nut 72 the head 70 of the bolt may be manipulated to cause the worm 68 to turn the crank arm 64 on the enlarged portion of shaft 28 by reason of its meshing with its teeth 66, whereupon the worm 62 may be tightened to preserve the adjustment so made.

While two illustrative embodiments of the invention have been described in detail, it is not my intention to limit its scope to those particular embodiments or otherwise than by the terms of the appended claim.

I claim:

Operating mechanism for a brake on a swivelled wheel comprising, in combination, a brake-applying shaft swivelling with the wheel, a non-swivelling shaft, the two shafts being arranged end to end, said first shaft provided at its outer end with a ball socket arranged substantially in the swiveling axis of the wheel, an arm carried by the outer end of said first shaft provided at its outer end with a plane surface portion arranged substantially in the swiveling axis of the wheel, said second shaft provided with a ball adjacent the end of the first shaft disposed in the socket of the first shaft whereby the first shaft supports the adjacent end of the second shaft, and an arm mounted upon the end of the second shaft adjacent the first shaft, said arm provided at its outer end with a ball engaging said plane surface portion of the arm of the first shaft coupling said shafts together for rotation.

In testimony whereof, I have hereunto signed my name.

ROY S. SANFORD.